United States Patent
Cox et al.

(10) Patent No.: US 9,497,906 B2
(45) Date of Patent: Nov. 22, 2016

(54) METHOD OF ASSEMBLING A PLATFORM TO SUPPORT A TREE AND ROOTBALL FOR TREE RELOCATION

(71) Applicant: Environmental Tree and Design, Inc., Tomball, TX (US)

(72) Inventors: Thomas P. Cox, Spring, TX (US); Mark A. Merit, The Woodlands, TX (US); Joseph B. Carlisle, Cypress, TX (US)

(73) Assignee: ENVIRONMENTAL TREE & DESIGN, INC., Tomball, TX (US)

( * ) Notice: Subject to any disclaimer, the term of this patent is extended or adjusted under 35 U.S.C. 154(b) by 0 days.

(21) Appl. No.: 14/919,893

(22) Filed: Oct. 22, 2015

(65) Prior Publication Data
US 2016/0113217 A1    Apr. 28, 2016

Related U.S. Application Data

(60) Provisional application No. 62/068,452, filed on Oct. 24, 2014.

(51) Int. Cl.
*A01G 23/04*    (2006.01)
*A01C 11/04*    (2006.01)

(52) U.S. Cl.
CPC ............. *A01G 23/046* (2013.01); *A01C 11/04* (2013.01); *A01G 23/04* (2013.01); *A01G 23/043* (2013.01)

(58) Field of Classification Search
CPC .... A01G 23/02; A01G 23/04; A01G 23/043; A01G 23/046; A01C 11/00
USPC ................................ 171/1; 111/101; 414/23
See application file for complete search history.

(56) References Cited

U.S. PATENT DOCUMENTS

| | | | | |
|---|---|---|---|---|
| 388,154 A | * | 8/1888 | Stanley et al. | A01G 23/04 47/76 |
| 835,585 A | * | 11/1906 | Uffmann | A01G 23/04 47/76 |
| 1,431,185 A | * | 10/1922 | Rowley | A01G 23/046 111/101 |

(Continued)

OTHER PUBLICATIONS

Service, Nicole; "Tree Preservation Takes Root with Oak's Transplant;" Archived Jul. 25, 2013; Retrieved Sep. 30, 2016; Moving a Large Tree; <https://web.archive.org/web/20130725171601/http://shadetreeexpert.com/moving-a-large-tree/>.*

(Continued)

*Primary Examiner* — Thomas B Will
*Assistant Examiner* — Joel F. Mitchell
(74) *Attorney, Agent, or Firm* — Patrick K. Steele; Jeffrey L. Streets; Streets & Steels

(57) ABSTRACT

A method of removing a tree and rootball includes the steps of excavating around the rootball, driving a plurality of pipes through a lower portion of the rootball to expose first ends on one side of the rootball and second ends on the other side of the rootball, disposing a first slotted beam across the topsides of the first ends of the plurality of pipes, disposing a second slotted beam across the topsides of the second ends of the plurality of pipes, interlacing a first lacing member with the first ends of the plurality of pipes and a first plurality of cross members, interlacing a second lacing member with the second ends of the plurality of pipes and a second plurality of cross members, and pulling the first and second lacing members taut to secure the first and second slotted beams to the pipes to create a platform.

12 Claims, 8 Drawing Sheets

(56) References Cited

U.S. PATENT DOCUMENTS

| | | | | |
|---|---|---|---|---|
| 1,874,029 A | * | 8/1932 | Condon | A01G 23/04 47/1.01 F |
| 4,658,737 A | * | 4/1987 | Weissberg | A01C 11/04 111/101 |
| 4,756,259 A | * | 7/1988 | Korenek | A01G 23/046 111/101 |
| 5,158,418 A | * | 10/1992 | Korenek | A01G 23/046 414/23 |
| 5,265,375 A | * | 11/1993 | Korenek | A01G 23/046 47/76 |
| 8,844,449 B2 | | 9/2014 | Merit et al. | |
| 2013/0305973 A1 | | 11/2013 | Merit et al. | |

OTHER PUBLICATIONS

International Searching Authority (ISA); International Search Report and Written Opinion; Aug. 1, 2013.

* cited by examiner

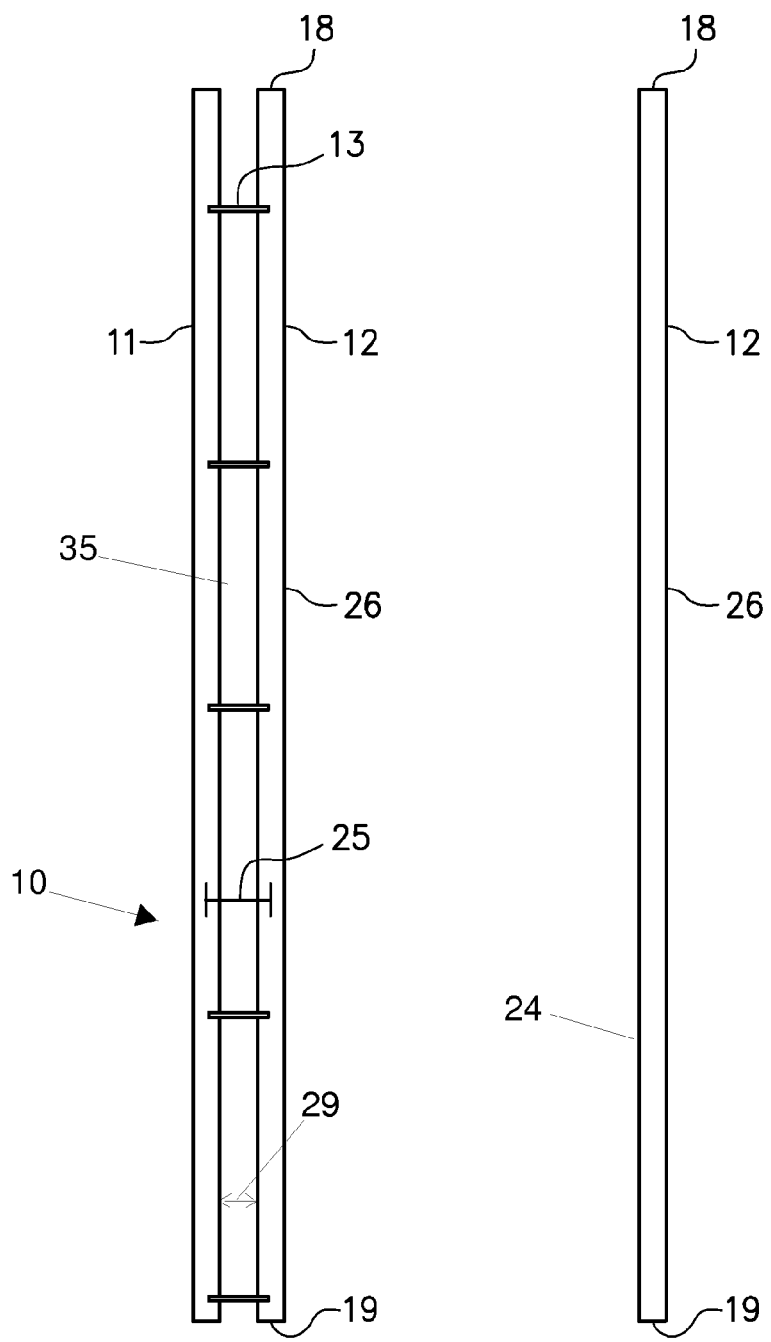

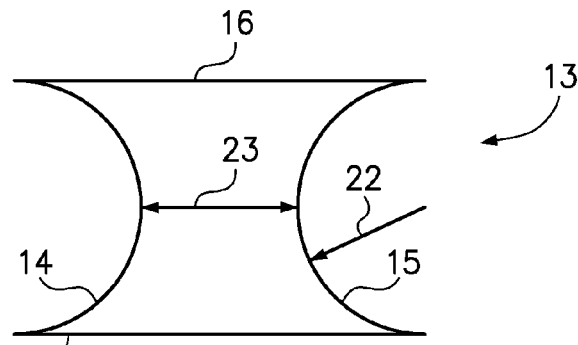
FIG. 5
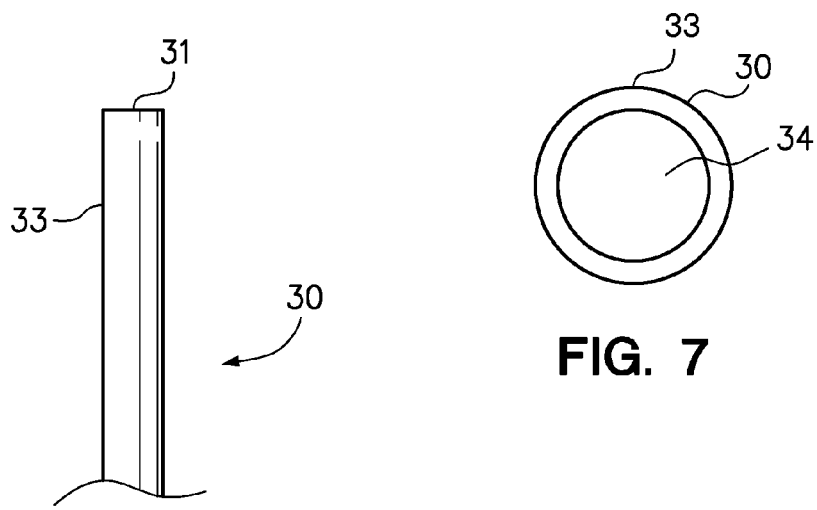
FIG. 6
FIG. 7
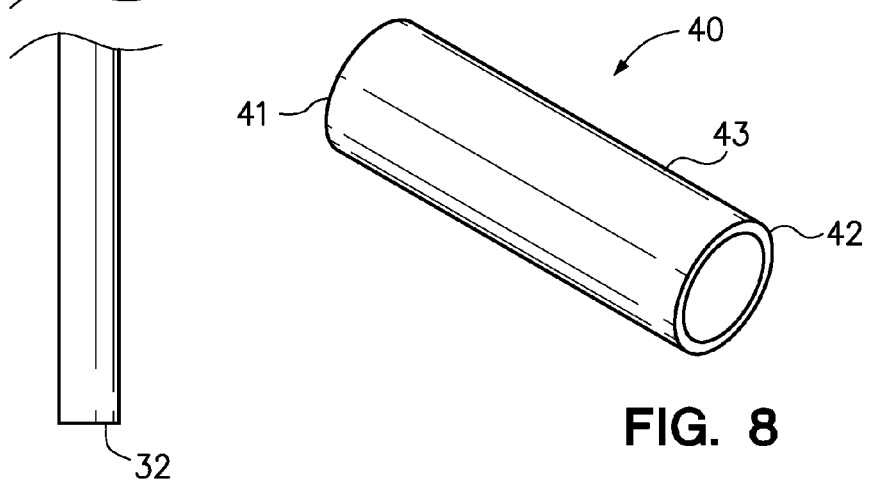
FIG. 8

METHOD OF ASSEMBLING A PLATFORM TO SUPPORT A TREE AND ROOTBALL FOR TREE RELOCATION

STATEMENT OF RELATED APPLICATIONS

This application depends from and claims priority to U.S. Provisional Application No. 62/068,452 filed on Oct. 24, 2014.

BACKGROUND

Field of the Invention

The present invention relates to the relocation of large trees. More specifically, the present invention relates to a method and a system for supporting a tree and a rootball of the tree for tree relocation.

Background of the Related Art

Trees can become quite large and, in some cases, can exceed one million pounds, including the rootball that surrounds the roots of the tree. Moving a tree of this size requires special care to preserve the rootball against damage that might otherwise cause the tree to die.

Large truck-mounted machines having a plurality of deployable spades have been used to move trees of moderate size, but these machines have size and weight limitations. Many trees are moved along with several feet of soil that resides more than 6 feet below the ground. However, the majority of the root system responsible for feeding and watering the tree resides within the first 3-feet of soil.

BRIEF SUMMARY

One embodiment of the present invention provides a method of removing a tree and rootball for transport to a new location, comprising the steps of excavating soil from a first excavation site on a first side of the rootball and from a second excavation site on a second side of the rootball that is opposite to the first side of the rootball, providing a plurality of tubular pipes, each having a first end, a second end, and a length therebetween exceeding the distance between the first excavation site and the second excavation site, driving the first end of each of the plurality of pipes to force the second end of each of the plurality of pipes through a lower portion of the rootball far enough to expose the second end of each of the plurality of pipes at the second excavation site and to expose the first end of each of the plurality of pipes at the first excavation site, with each of the plurality of pipes being parallel to the others of the plurality of pipes, providing a first split beam having a first end, a second end, a width, a first elongate beam member and a second elongate beam member coupled to the first beam member in a parallel and a spaced-apart relationship to provide a slot intermediate the first beam member and the second beam member of the first split beam, providing a second split beam having a first end, a second end, a width, a first elongate beam member and a second elongate beam member coupled to the first beam member in a parallel and a spaced-apart relationship to provide a slot intermediate the first beam member and the second beam member of the second split beam, disposing the first split beam atop and perpendicular to the first ends of the plurality of pipes exposed at the first excavation site, disposing the second split beam atop and perpendicular to the second ends of the plurality of pipes exposed at the second excavation site, providing a first plurality of cross members, each having a length sufficient to span the slot of the first slotted beam, providing a second plurality of cross members, each having a length sufficient to span the slot of the second slotted beam, disposing the first plurality of cross members on the first slotted beam in a spaced apart relationship to span the slot of the first slotted beam, disposing the second plurality of cross members on the second slotted beam in a spaced apart relationship to span the slot of the second slotted beam, providing an elongate and flexible first lacing member having a first end and a second end, securing the first end of the first lacing member to the first end of the first slotted beam, interlacing the first lacing member in a repeating pattern of which a cycle of the repeating pattern includes the first lacing member extending around the first end of one of the plurality of pipes on which the first slotted beam rests, through the slot of the first slotted beam, around an adjacent one of the plurality of cross members atop the first slotted beam and proximal to the first end of the one of the plurality of pipes, and through the slot of the first slotted beam towards another of the plurality of pipes that is adjacent to the one of the plurality of pipes, pulling the first lacing member taut to urge the first ends of the plurality of pipes against an underside of the first slotted beam and to urge the first plurality of cross members against the topside of the first slotted beam, securing the second end of the first lacing member to the second end of the first slotted beam to retain the first ends of the plurality of pipes against the underside of the first slotted beam, providing an elongate and flexible second lacing member having a first end and a second end, securing the first end of the second lacing member to the first end of the second slotted beam, interlacing the second tension member in a repeating pattern of cycles, each cycle of which includes the second lacing member extending around the second end of one of the plurality of pipes on which the second slotted beam rests, through the slot of the second slotted beam, around an adjacent one of the plurality of cross members atop the second slotted beam and proximal to the second end of the one of the plurality of pipes, and through the slot of the second slotted beam towards another of the plurality of pipes that is adjacent to the one of the plurality of pipes, pulling the second lacing member taut to urge the second ends of the plurality of pipes against an underside of the second slotted beam and to urge the second plurality of cross members against the topside of the second slotted beam, securing the second end of the second lacing member to the second end of the second slotted beam to retain the second ends of the plurality of pipes against the underside of the second slotted beam, wherein the first and second slotted beams, the first and second pluralities of cross members, and the plurality of pipes, secured together in this method, provide a platform on which the tree and rootball can be moved with minimal damage to the rootball.

The method may further be embodied wherein the first slotted beam includes one or more braces spanning the slot of the first slotted beam, wherein the one or more braces are each connected at a first end to the first beam member and at a second end to the second beam member, and wherein the one or more braces stabilize the first slotted beam. Further, the method may further be embodied wherein the second slotted beam includes one or more braces spanning the slot of the second slotted beam, wherein the one or more braces are each connected at a first end to the first beam member and at a second end to the second beam member, and wherein the one or more braces stabilize the second slotted beam.

A related embodiment of the method may be embodied wherein the topside of the first slotted beam includes a plurality of détentes in which the first plurality of cross members may settle and remain, and wherein the topside of the second slotted beam includes a plurality of détentes in which the second plurality of cross members may settle and remain.

A related embodiment of the method may be embodied wherein pulling the first lacing member taut to urge the first ends of the plurality of pipes against an underside of the first slotted beam and to urge the first plurality of cross members against the topside of the first slotted beam includes providing a hydraulic cylinder having a retracted configuration and an extended configuration, coupling the hydraulic cylinder to the first lacing member, and stroking the hydraulic cylinder from one of the retracted configuration and the extended configuration to the other of the retracted configuration and the extended configuration to pull the first lacing member taut.

This invention includes embodiments wherein the first and second lacing members are chains, cables, ropes, cords and belts. A related embodiment of the method includes embodiments wherein the first and second lacing members are chains, and wherein the ends of the first and second lacing members are secured using keepers having a slot to receive a link of a chain.

It will be understood that these embodiments may include the use of hydraulics, cranes, heavy equipment, winches, and tools that are generally known and used by persons in the tree relocation arts.

BRIEF DESCRIPTION OF THE SEVERAL VIEWS OF THE DRAWINGS

FIG. 3 is a plan view of a slotted beam having a first beam member and a second beam member.

FIG. 4 is a side view of the slotted beam of FIG. 3.

FIG. 5 is an elevation view of an embodiment of a brace to be used to stabilize the slotted beam of FIGS. 3 and 4.

FIG. 6 is an elevation view of a pipe.

FIG. 7 is an end view of the pipe of FIG. 6.

FIG. 8 is a perspective view of a cross member.

DETAILED DESCRIPTION

One embodiment of the present invention provides a method of assembling a platform on which a tree 50 and rootball 58 can be moved to a new location. One embodiment of the prevent invention provides a method of removing a tree 50 and rootball 58 to a new location with minimal damage to the rootball 58 and the tree 50, and with increased success and tree survival rates. The appended drawings illustrate the manner in which the platform 90 is assembled in order to provide for relocation of the tree 50 and rootball 58.

Figure 1:
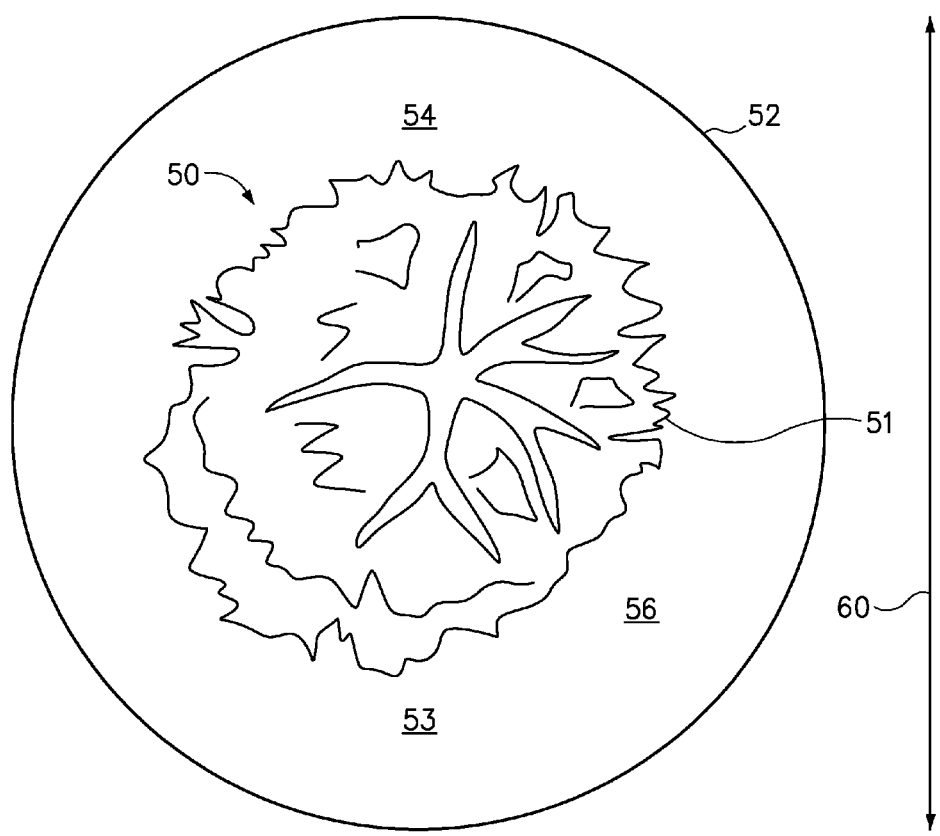
FIG. 1 is a plan view of a tree and rootball (not shown) to be together removed from the site.

FIG. 1 is a plan view of a tree 50 with branches 51 and a rootball 58 (not shown in FIG. 1) to be together removed and relocated from the site. The tree 50 and rootball 58 are between a first excavation site 53 and a second excavation site 54 on the other side of the rootball 58 from the first excavation site 53. The tree 50 is illustrated as rooted in and thereby secured to the earth 56. A work perimeter 52 is illustrated as surrounding the tree 50, the rootball 58, the first excavation site 53 and the second excavation site 54. The diameter 60 of the work perimeter 52 is merely for purposes of illustration of the clearance around the rootball 58 in which excavation will provide such required clearance.

Figure 2:
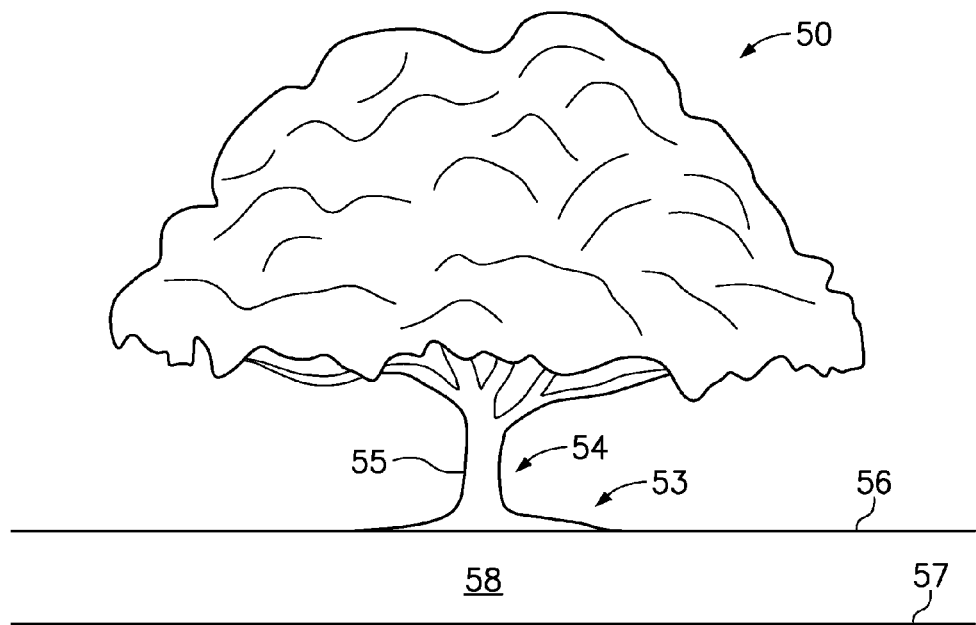
FIG. 2 is an elevation view of the tree and rootball (not shown) of FIG. 1.

FIG. 2 is an elevation view of the tree 50 of FIG. 1 that reveals the tree trunk 55, the earth 56 and the rootball 58 of the tree of FIG. 1. The first excavation site 53 is between the viewer of FIG. 2 and the trunk 55 of the tree 50 and second excavation site 54 is on the opposite side of the trunk 55 of the tree 50 from the viewer of FIG. 2. Also illustrated in FIG. 2 is a targeted work floor 57 to which the earth will be removed during excavation of, and only in, the first excavation site 53 and the second excavation site 54 to expose the radially outer walls 59 (not shown in FIG. 2—see FIG. 9) of the rootball 58. It will be understood that the depth of the targeted work floor 57 to which the first excavation site 53 and the second excavation 54 site are to be dug out is about four to five feet, a depth above which about 90% or more of the rootball 58 of a mature tree 50 resides. It has been found that a depth of four to five feet for excavation results in a high rate of success of the relocation of the tree 50 and rootball 58, if these are moved without excessive damage. It will be further understood that the excavation depth to be used in connection with embodiments of the method of the present invention may vary, and will depend on the type of tree 50, the structure of the rootball 58, the type of earth in which the tree 50 is rooted, the age, maturity and the size of the tree 50.

FIG. 3 is a plan view of a slotted beam 10 having a first beam member 11, a second beam member 12 that is generally parallel to the first beam member 11, a first end 18 and a second end 19. The slotted beam 10 of FIG. 3 also illustrates a plurality of braces 13 that can be provided to stabilize the slotted beam 10 and to secure the first beam member 11 to the second beam member 12. The braces 13 may, in one embodiment, be spot welded to each of the first beam member 11 and the second beam member 12. The first beam member 11 and the second beam member 12 of the slotted beam 10 of FIG. 3 are separated by a span 25, which is approximately the distance between an axis of the first beam member 11 and an axis of the second beam member 12. The In FIGS. 3-7, the first beam member 11 and the second beam member 12 are tubular, meaning that the first beam member 11 and the second beam member 12 of the slotted beam 10 each have a circular cross section. However, it will be understood that embodiments of the method may include the use of slotted beams 10 having a first beam member 11 and a second beam member 12 having a square, rectangular or other geometric cross section.

The slotted beam 10 of FIG. 3 includes a span 25 that is approximately from the middle of the first beam member 11 to the middle of the second beam member 12. This distance as it is illustrated in FIG. 3 is a function of the size of the braces 13 that connected to the first beam member 11 and the second beam member 12. A slot 35 extends between the first beam member 11 and the second beam member 12. It will be understood that the span 25 is slightly greater than the width of the slot 35.

FIG. 4 is a side view of the slotted beam 10 of FIG. 3 and reveals a topside 26 and an underside 24.

FIG. 5 is an elevation view of an embodiment of a brace 13 that can be provided to stabilize the slotted beam 10 of FIGS. 3 and 4. It will be noted that the brace 13 of FIG. 5 includes opposed cut-outs 14 and 15, each having an arc corresponding to the size (radius) of the tubular cross-section of the first beam member 11 and the second beam member 12 of the slotted beam 10. The cut-outs 14 and 15 of the brace 13 of FIG. 5 have a radius 22 and a cut-out separation 23. The brace 13 of FIG. 5 includes a top 16 and a bottom 17.

FIG. 6 is an elevation view of an elongate and tubular pipe 30 which, provided in a plurality of pipes 30, can be used to implement embodiments of the method of the present invention. The elongate pipe 30 has a first end 31 and a second end 32 and an exterior surface 33. FIG. 7 is an end view of the pipe 30 of FIG. 6 and reveals a bore 34 and the exterior 33. It will be noted that the pipe 30 of FIGS. 6 and 7 shows a substantial wall thickness between the bore 34 and the exterior surface 33.

FIG. 8 is a perspective view of a cross member 40 that can be used to implement embodiments of the method of the present invention. The cross member 40 has a first end 41 and a second end 42, and an exterior surface 43.

Figure 9:
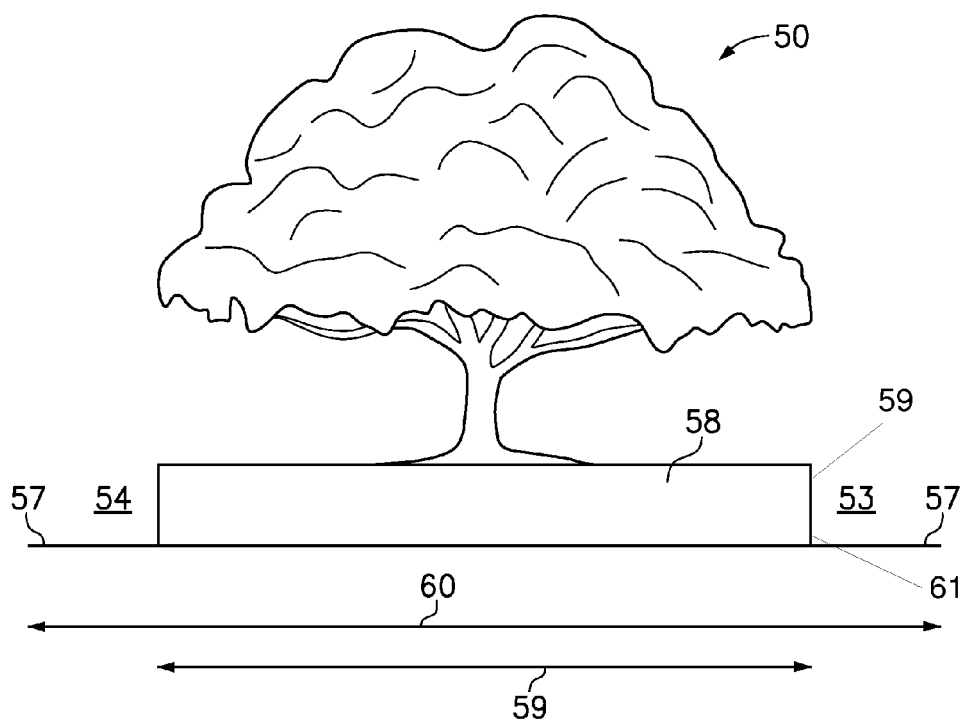
FIG. 9 is an elevation view of the tree of FIGS. 1 and 2 after excavation at a first and a second excavation site to expose the exterior of a rootball to be removed with the tree.

FIG. 9 is the elevation view of the tree of FIGS. 1 and 2 after excavation at the first excavation site 53 and at the second excavation site 54 to expose the rootball 58 to be removed from the location along with the tree 50. It will be noted that the depth of excavation is to the level of 57 and that the diameter 59 of the rootball 58 corresponds generally to the drip line of the tree 50. It will further be noted that the work area clearance 60 about the rootball 58 provides sufficient space for a crew to position and then drive a plurality of the pipes 30 of FIGS. 6 and 7 through a lower portion 61 of the rootball 58.

Figure 10:
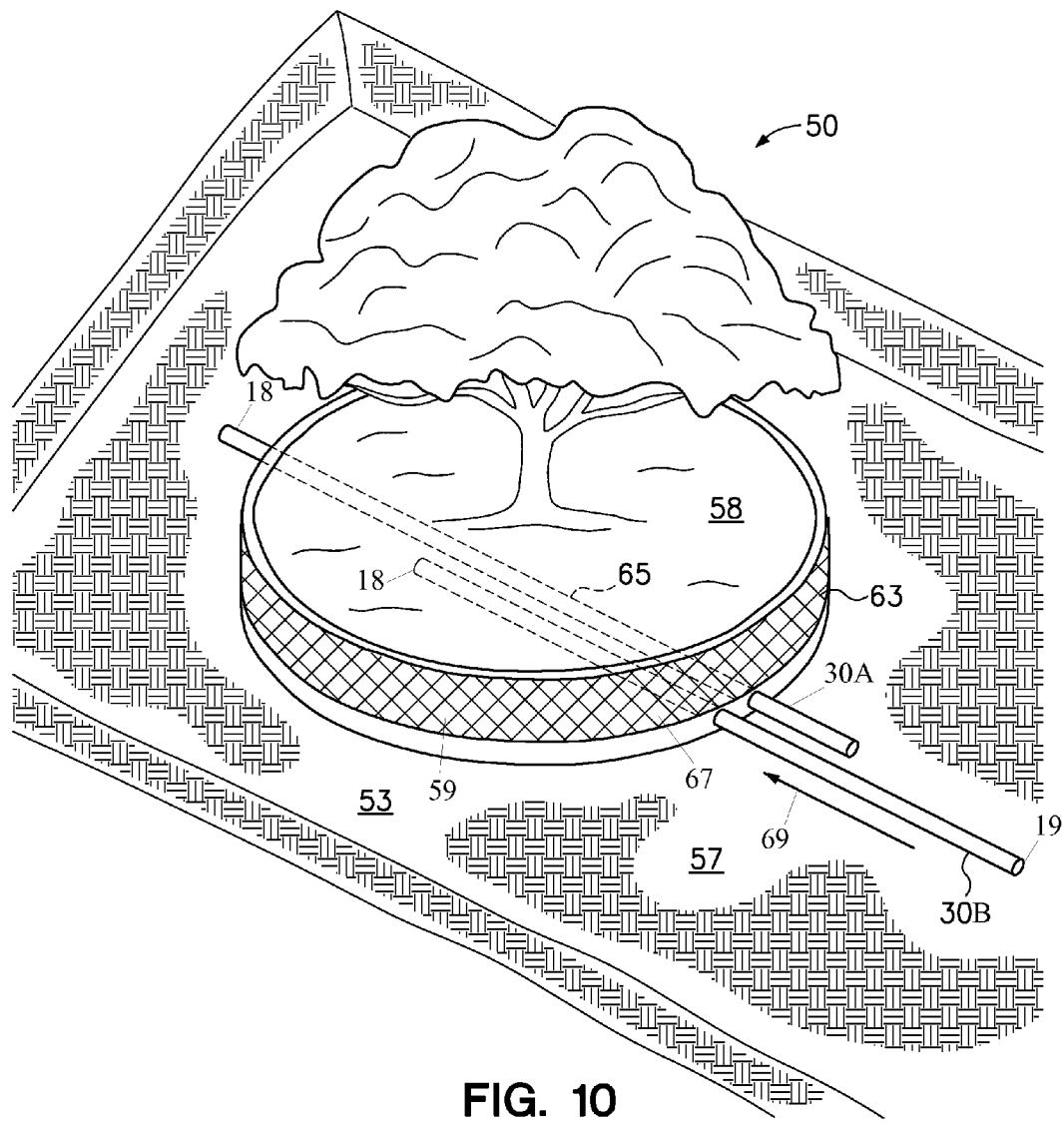
FIG. 10 is a perspective view of the tree and rootball of FIGS. 1, 2 and 9 illustrating the manner in which a plurality of pipes are driven through a lower portion of the rootball of the tree.

FIG. 10 is a perspective view of the tree 50 and rootball 58 of FIGS. 1, 2 and 9 illustrating the manner in which a plurality of pipes 30 are driven through a lower portion 61 of the rootball 58 of the tree 50. Optionally, the radially outer surface 59 of the rootball 58 may be protected by application of a cloth or plastic sheet material 67 such as burlap or plastic sheeting, and then by securing wire fencing, such as chicken wire, around the rootball 58. The first excavation site 53 and the second excavation site 54 (not shown in FIG. 10) are on opposite sides of the rootball 58. The targeted work floor 57 is now exposed and available for use by the crew that drives the plurality of pipes 30 into the lower portion 61 of the rootball 58.

FIG. 10 illustrates how a first pipe 30A has been driven through the lower portion 61 of the rootball 58 by introducing the first end 18 of the first pipe 30A into the lower portion 61 of the rootball 58 adjacent to the first excavation site 53 and then driven using, for example, a rock hammer, a mobile vehicle or other equipment engaged with the second end 19 of the first pipe 30A, to penetrate the lower portion 61 of the rootball 58 until the first end 18 of the first pipe 30A is exposed at the second excavation site 54. In a preferred embodiment of the method, the exposed portion of the first end 18 of the first pipe 30A is about the same length as the exposed portion of the second end 19 of the first pipe 30A when the first pipe 30A is properly driven and positioned within the lower portion 61 of the rootball 58. FIG. 10 further illustrates a second pipe 30B being driven into the lower portion 61 of the rootball 58 of the tree 50. The second pipe 30B is illustrated as being generally parallel to and adjacent to the first pipe 30A. The second pipe 30B will continue to be driven, from the second end 19 and in the direction of the arrow 69, until the first end 18 of the second pipe 30A is proximal to the first end 18 of the first pipe 30A. Additional pipes 30 will be installed at a generally equal spacing.

Figure 11:
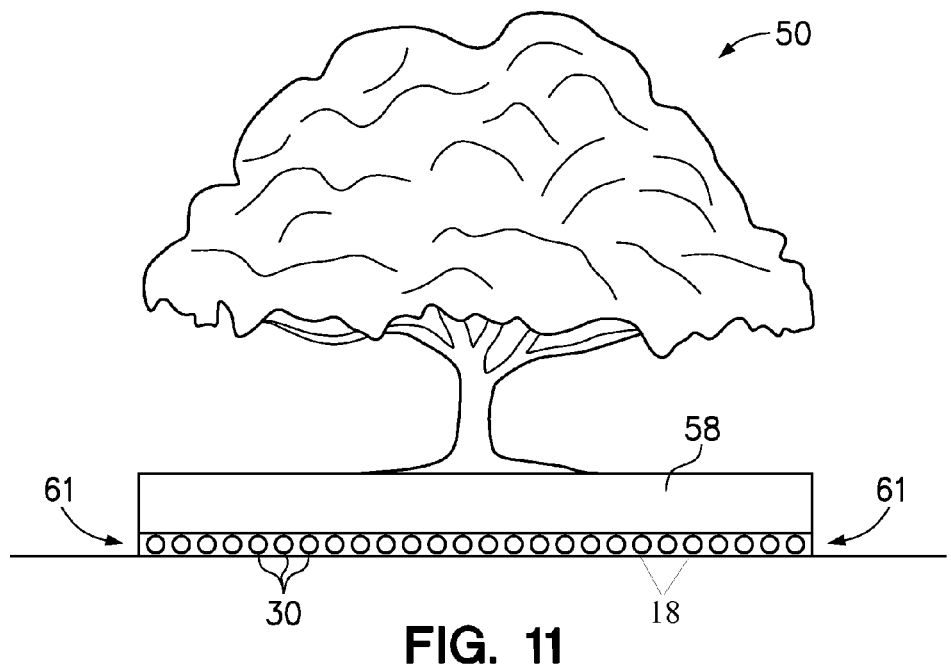
FIG. 11 is the elevation view of FIG. 9 after the plurality of pipes have been driven through the lower portion of the rootball.

FIG. 11 is the elevation view of FIG. 9 after the plurality of pipes have been driven through the lower portion 61 of the rootball 58. The plurality of pipes 30 are at a generally equal spacing and in a parallel relationship into the lower portion 61 of the rootball 58. The driven plurality of pipes 30 are in position within the lower portion 61 of the rootball 58 for being together secured at a first end 18 to a first slotted beam 30 (not shown in FIG. 11) and at a second end 19 (not shown in FIG. 11) to a second slotted beam 30 (not shown in FIG. 11).

Figure 12:
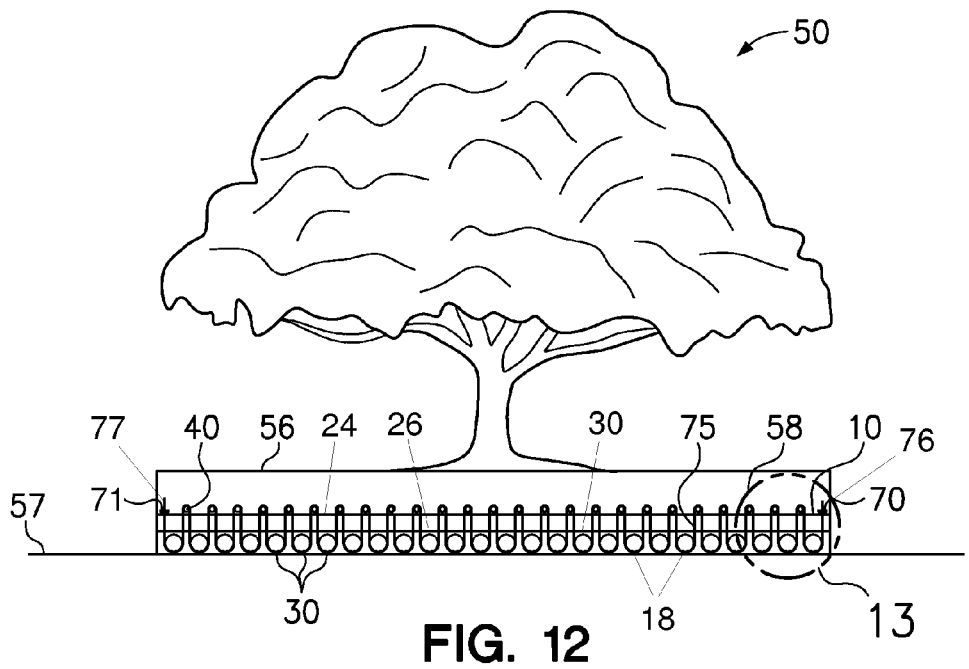
FIG. 12 is the elevation view of FIG. 11 after the slotted beams have been laid across the first ends of the plurality of pipes and a lacing member has been interlaced in a repeating pattern of cycles about the plurality of pipes and the plurality of cross members, passing through the slot of the slotted beam between engagement with each of the cross members and the adjacent pipe.

FIG. 12 is the elevation view of FIG. 11 after the first slotted beam 30 has been laid generally perpendicularly across the first ends 18 of the plurality of pipes 30 and a lacing member 75, such as a chain, a rope, a cable or some other tension bearing flexible member, has been interlaced in a repeating pattern of alternating cycles about the plurality of pipes 30 and the plurality of cross members 40, passing through the slot 35 (not shown in FIG. 126—see FIG. 3) of the slotted beam 30 between the engagement of the lacing member 75 with each cross members 40 and, alternatingly, each of the adjacent pipes 30.

A first end 76 of the lacing member 75 is secured to a first keeper 70 and the second end 77 of the lacing member 75 is secured to a second keeper 71 after the second end 77 is pulled taut, using a power source such as, for example, a man, a crew or, most preferably, a hydraulic cylinder. It will be understood that the configuration of the lacing member 75 enables the plurality of pipes 30 to be secured by the lacing member 75 against an underside 26 of the first slotted beam 30. It will be further understood that the plurality of cross members 40 each span the width 25 of the slot 35 (see FIG. 3) of the slotted beam 30 on a topside 24 to retain the lacing member 75 in a tensioned state.

Figure 13:
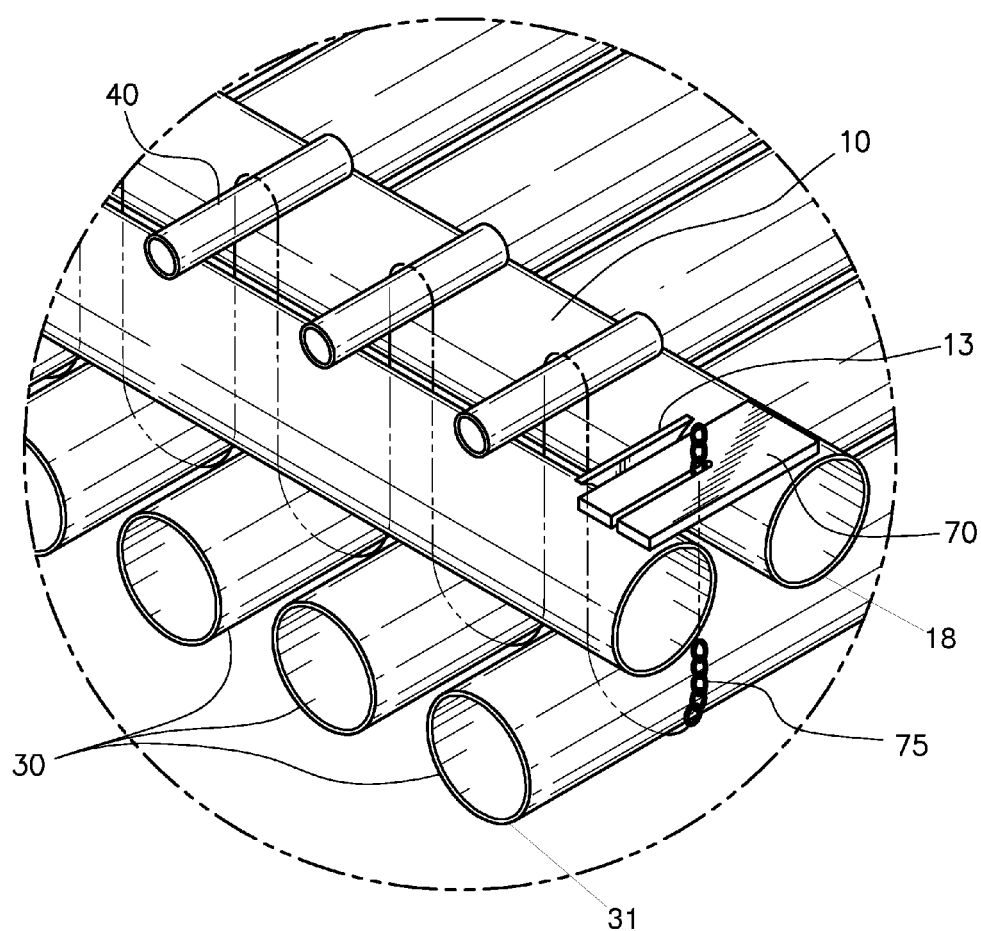
FIG. 13 is an enlarged view perspective view of a portion of FIG. 12 illustrating the manner in which the lacing member is interlaced with the plurality of pipes and the plurality of cross members to secure the pipes to the slotted beam.

FIG. 13 is an enlarged perspective view of a portion of the assembled platform 90 of FIG. 12 illustrating the manner in which the lacing member 75 is alternatingly interlaced with the plurality of pipes 30 and the plurality of cross members 40 to secure the pipes 30 (and the cross members 40) to the slotted beam 10. The lacing member 75 is, in the embodiment of the method illustrated in FIG. 13, a chain, and the majority of the interlaced pathway of the lacing member 75 is shown as a line to prevent from occluding the view of the pathway. It will be understood that a second slotted beam 10 is similarly disposed atop and perpendicular to the first ends 31 of the plurality of pipes 30. It will be understood that the second slotted beam 10 is similarly secured to the second ends 32 of the plurality of pipes 30 at the second excavation site 54 on the opposite side of the rootball 58.

The platform 90 assembled in the manner illustrated by FIGS. 1-13 can be moved with the tree 50 and the rootball 58 supported thereon using inflatable bladders and the method disclosed in U.S. Pat. No. 8,844,449 and U.S. Publication no. 2013/0305973 as is now known in the art as a result of these pioneering disclosures by the Applicant herein. U.S. Pat. No. 8,844,449 and U.S. Publication no. 2013/0305973 are incorporated into this disclosure in their entirety. More specifically, the platform 90 and the tree 50 and the rootball 58 supported thereon can be moved by tunneling underneath the platform 90 to form a plurality of tunnels underneath the platform 90, disposing a deflated inflatable and elongate airbag in each of the plurality of tunnels, inflating the airbags to elevate the platform 90, the tree 50 and the rootball 58 above the earth.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of forming a platform for use in relocating a tree and rootball for transport to a new location, comprising:
   excavating soil from a first excavation site on a first side of the rootball and from a second excavation site on a second side of the rootball opposite to the first side;
   providing a plurality of pipes, each having a first end, a second end, and a length therebetween exceeding the distance between the first excavation site and the second excavation site;
   driving the second end of each of the plurality of pipes through a lower portion of the rootball to expose the second end of each of the plurality of pipes at the second excavation site and to expose the first end of each of the plurality of pipes at the first excavation site, with each of the plurality of pipes being parallel to the others of the plurality of pipes;
   providing a first slotted beam having a first end, a second end, a width, a first elongate beam member and a second elongate beam member coupled to the first beam member in a parallel and a spaced-apart relationship to provide a slot intermediate the first beam member and the second beam member;
   providing a second slotted beam having a first end, a second end, a width, a first elongate beam member and a second elongate beam member coupled to the first beam member in a parallel and a spaced-apart relationship to provide a slot intermediate the first beam member and the second beam member;
   disposing the first slotted beam atop and perpendicular to the first ends of the plurality of pipes exposed at the first excavation site;
   disposing the second slotted beam atop and perpendicular to the second ends of the plurality of pipes exposed at the second excavation site;
   providing a first plurality of cross members having a length sufficient to span the slot of the first slotted beam;
   providing a second plurality of cross members having a length sufficient to span the slot of the second slotted beam;
   disposing the first plurality of cross members on the first slotted beam to span the slot of the first slotted beam;
   disposing the second plurality of cross members on the second slotted beam to span the slot of the second slotted beam;
   providing an elongate and flexible first lacing member having a first end and a second end;
   securing the first end of the first lacing member to the first end of the first slotted beam;
   interlacing the first lacing member in a repeating pattern of which a cycle of the repeating pattern includes the first lacing member extending around the first end of one of the plurality of pipes on which the first slotted beam rests, through the slot of the first slotted beam, around an adjacent one of the plurality of cross members atop the first slotted beam and proximal to the first end of the one of the plurality of pipes, and through the slot of the first slotted beam towards another of the plurality of pipes that is adjacent to the one of the plurality of pipes;
   pulling the first lacing member taut to urge the first ends of the plurality of pipes against an underside of the first slotted beam and to urge the first plurality of cross members against a topside of the first slotted beam;
   securing the second end of the first lacing member to the second end of the first slotted beam to retain the first ends of the plurality of pipes against the underside of the first slotted beam;
   providing an elongate and flexible second lacing member having a first end and a second end;
   securing the first end of the second lacing member to the first end of the second slotted beam;
   interlacing the second lacing member in a repeating pattern of cycles, each cycle of which includes the second lacing member extending around the second end of one of the plurality of pipes on which the second slotted beam rests, through the slot of the second slotted beam, around an adjacent one of the plurality of cross members atop the second slotted beam and proximal to the second end of the one of the plurality of pipes, and through the slot of the second slotted beam towards another of the plurality of pipes that is adjacent to the one of the plurality of pipes;
   pulling the second lacing member taut to urge the second ends of the plurality of pipes against an underside of the second slotted beam and to urge the second plurality of cross members against a topside of the second slotted beam; and
   securing the second end of the second lacing member to the second end of the second slotted beam to retain the second ends of the plurality of pipes against the underside of the second slotted beam;

wherein the first and second slotted beams, the first and second pluralities of cross members, and the plurality of pipes, secured together in this method, provide a platform on which the tree and rootball can be moved with minimal damage to the rootball.

2. The method of claim 1, wherein the first slotted beam includes one or more braces spanning the slot of the first slotted beam; and
wherein the one or more braces are each connected at a first end to the first beam member and at a second end to the second beam member;
wherein the one or more braces stabilize the first slotted beam.

3. The method of claim 2, wherein the second slotted beam includes one or more braces spanning the slot of the second slotted beam; and
wherein the one or more braces are each connected at a first end to the first beam member and at a second end to the second beam member;
wherein the one or more braces stabilize the second slotted beam.

4. The method of claim 1, wherein the topside of the first slotted beam includes a plurality of détentes in which the first plurality of cross members may settle; and
wherein the topside of the second slotted beam includes a plurality of détentes in which the second plurality of cross members may settle.

5. The method of claim 1, wherein pulling the first lacing member taut to urge the first ends of the plurality of pipes against the underside of the first slotted beam and to urge the first plurality of cross members against the topside of the first slotted beam includes:
providing a hydraulic cylinder having a retracted configuration and an extended configuration;
coupling the hydraulic cylinder to the first lacing member;
stroking the hydraulic cylinder from one of the retracted configuration and the extended configuration to the other of the retracted configuration and the extended configuration to pull the first lacing member taut.

6. The method of claim 1, wherein the first and second lacing members are chains, cables, ropes, cords or belts.

7. The method of claim 6 wherein the first and second lacing members are chains; and
wherein the ends of the first and second lacing members are secured using keepers having a slot to receive a link of a chain.

8. A method of assembling a platform to support a tree and rootball for relocation, comprising:
providing a plurality of elongate tubular members, each having a first end and a second end separated by more than a diameter of the rootball of the tree to be relocated;
providing a first slotted beam having a slot, a span, a first end and a second end;
providing a second slotted beam having a slot, a span, a first end and a second end;
providing a first tensile member having a first end, a second end and a length therebetween;
providing a second tensile member having a first end, a second end and a length therebetween;
providing a first plurality of cross members, each having a length at least as long as the span of the first slotted beam;
providing a second plurality of cross members, each having a length at least as long as the span of the second slotted beam;
excavating a first excavation site to a first depth adjacent to the rootball of the tree to be relocated;
excavating a second excavation site to a second depth adjacent to the rootball of the tree and diametrically opposite the rootball from the first excavation site;
driving each of the first ends of the plurality of the elongate tubular members to force the second ends of each of the one of the elongate tubular members to penetrate the earth underneath the rootball of the tree and from the first excavation side to emerge from underneath the rootball at the second excavation site, and to position the plurality of elongate tubular members with the first ends of each of the plurality of elongate tubular members horizontally adjacent to the first ends of at least one of other elongate tubular members and to position the second ends of each of the plurality of elongate tubular members horizontally adjacent to the second ends of at least one of the other elongate tubular members;
securing the first end of the first tensile member to a first end of the first slotted beam;
interlacing the first tensile member alternatingly around one of the plurality of cross members disposed atop the first slotted beam and then around one of the first ends of the proximal one of the elongate tubular members, progressing to the next one of the plurality of cross members and adjacent first end of the elongate tubular members;
interlacing the second tensile member alternatingly around one of the plurality of cross members disposed atop the second slotted beam and then around one of the second ends of the proximal one of the elongate tubular members, progressing to the next one of the plurality of cross members and adjacent second end of the elongate tubular members;
pulling the second end of the first tensile member to secure the first plurality of cross members against the topside of the first slotted beam and to secure each of the first ends of each of the elongate tubular members against the underside of the first slotted beam;
pulling the second end of the second tensile member to secure the second plurality of cross members against the topside of the second slotted beam and to secure each of the second ends of each of the elongate tubular members against the underside of the second slotted beam;
securing the second end of the first tensile member to the first slotted beam and securing the second end of the second tensile member to the second slotted beam to form a platform comprising the plurality of elongate tubular members, the first plurality of cross members, the second plurality of cross members, the first tensile member and the second tensile member; and
engaging and supporting the platform to relocate the tree and rootball.

9. The method of claim 8, wherein the span of the first slotted beam is equal to the span of the second slotted beam.

10. The method of claim 8, wherein the first tensile member and second tensile member are one of chains, ropes and cables.

11. The method of claim 8, wherein driving each of the first ends of the plurality of the elongate tubular members to force the second ends of each of the one of the elongate tubular members to penetrate the earth underneath the rootball of the tree and from the first excavation side to emerge from underneath the rootball at the second excavation site, and to position the plurality of elongate tubular members with the first ends of each of the plurality of elongate tubular members horizontally adjacent to the first ends of at least one of the other elongate tubular members and to position the second ends of each of the plurality of elongate tubular members horizontally adjacent to the second ends of at least one of the other elongate tubular members comprises:

providing a jack hammer;

successively engaging the jack hammer with the first end of each of the plurality of elongate tubular members with the elongate tubular members in a horizontal position, and driving each of the first ends of the plurality of the elongate tubular members to force the second ends of each of the one of the elongate tubular members to penetrate the earth underneath the rootball of the tree and from the first excavation side to emerge from underneath the rootball at the second excavation site, and to position the plurality of elongate tubular members with the first ends of each of the plurality of elongate tubular members horizontally adjacent to the first ends of at least one of the other elongate tubular members and to position the second ends of each of the plurality of elongate tubular members horizontally adjacent to the second ends of at least one of the other elongate tubular members.

12. The method of claim 11, wherein the elongate tubular members lie in a common horizontal plane underneath the rootball of the tree.

\* \* \* \* \*